July 29, 1924.

G. E. PERRY

DENTAL APPLIANCE

Filed Feb. 26, 1921

1,503,063

Inventor
George Elliot Perry

Patented July 29, 1924.

1,503,063

UNITED STATES PATENT OFFICE.

GEORGE ELLIOT PERRY, OF CHICAGO, ILLINOIS.

DENTAL APPLIANCE.

Application filed February 26, 1921. Serial No. 448,222.

*To all whom it may concern:*

Be it known that I, GEORGE ELLIOT PERRY, a citizen of the United States, residing at Chicago, in the county of Cook and State of Illinois, have invented certain new and useful Improvements in Dental Appliances, of which the following is a specification.

The invention relates to improvements in devices for cleaning the teeth and consists of an especially prepared stick for this purpose which I call a dental stick.

One of the objects of the invention is to provide an improved means and device for cleaning the teeth.

Another object of the invention is to provide a means for removing the undesirable deposits or excrescence from the teeth without irritating the gums.

In carrying my invention into effect I procure small sticks of rattan or other similar porous wood or substance, about as long as the ordinary friction match and somewhat larger in diameter, and after thoroughly sterilizing them I fill their pores and slightly cover their surfaces with a dentifrice having in its incorporation a suitable abrasive and detergent and any other desired ingredient useful for the purpose and generally contained in so called tooth powder or paste.

The wooden stick best adapted has longitudinally extending minute holes or pores, the holes about or nearly equaling the solid content of the cross sectional area. Rattan, some species of palm and many other woods of similar nature may advantageously be used.

In the drawings Fig. 1 shows the stick as prepared and enclosed in a sealed, sterilized envelope or jacket.

In all the views the same reference characters are employed to indicate similar parts.

After the sticks have been made of uniform size and sterilized the pores of the sticks are filled with the dentifrice.

Figure 1:
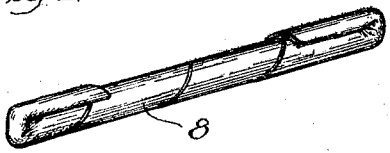
Figure 2:
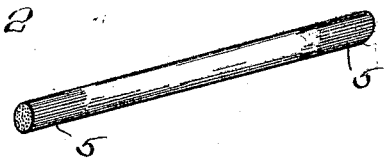
Fig. 2 is an elevation of the stick.
Figure 3:
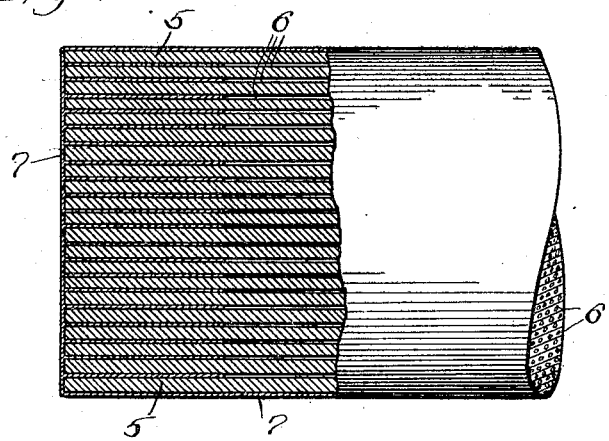
Fig. 3 is a greatly enlarged view of a fragment of the prepared stick showing part in section.

A convenient manner of filling and coating the sticks consists in placing a large number of them in a tumbling barrel with the dentifrice in powdered form and then rotating the barrel. The agitation of the contents of the barrel will cause the exceedingly fine powder to enter and fill the pores of the wood for some distance from the ends, as shown at 5 in Figs. 2 and 3. The pores 6 are impregnated for some distances from the ends with the powder 7 and the stick is superficially covered with it. The powder can be made to be adhesive so it will remain in contact with the stick in sufficient quantity for some time.

Each stick is enclosed and hermetically sealed in a sanitary jacket 8 so that it will not become infected. The jacket may be cut away from the end of the stick as it is being used or the jacket may entirely be removed and the stick subsequently, after each use, replaced therein.

To use the stick, either end is rubbed over the inside and outside surface of the teeth. The used end of the stick soon forms into a rather stiff, brush-like cleanser which may be cut off from time to time. The stick will contain sufficient powder to last so long as the stick remains serviceable.

It is a convenient manner of having the powder always available without the necessity for carrying a separate package of powder.

Having described my invention what I claim as new and desire to secure by Letters Patent, is:—

1. An article of manufacture comprising a porous stick with the natural pores thereof filled with a powdered dentifrice, and a sanitary jacket enclosing and hermetically sealing the stick.

2. An article of manufacture comprising a stick of porous material in which the pores are uniformly distributed having its pores impregnated with an abrasive powder.

3. An article of manufacture comprising a sterilized stick of uniformly distributed porous material having its pores impregnated with an abrasive powder, and a sanitary jacket enclosing and hermetically sealing the stick.

4. An article of manufacture comprising a stick having normally open natural pores extending longitudinally thereof and a powdered dentifrice within the pores.

In testimony whereof I hereunto subscribe my name.

GEORGE ELLIOT PERRY.